United States Patent Office 2,821,698
Patented Jan. 28, 1958

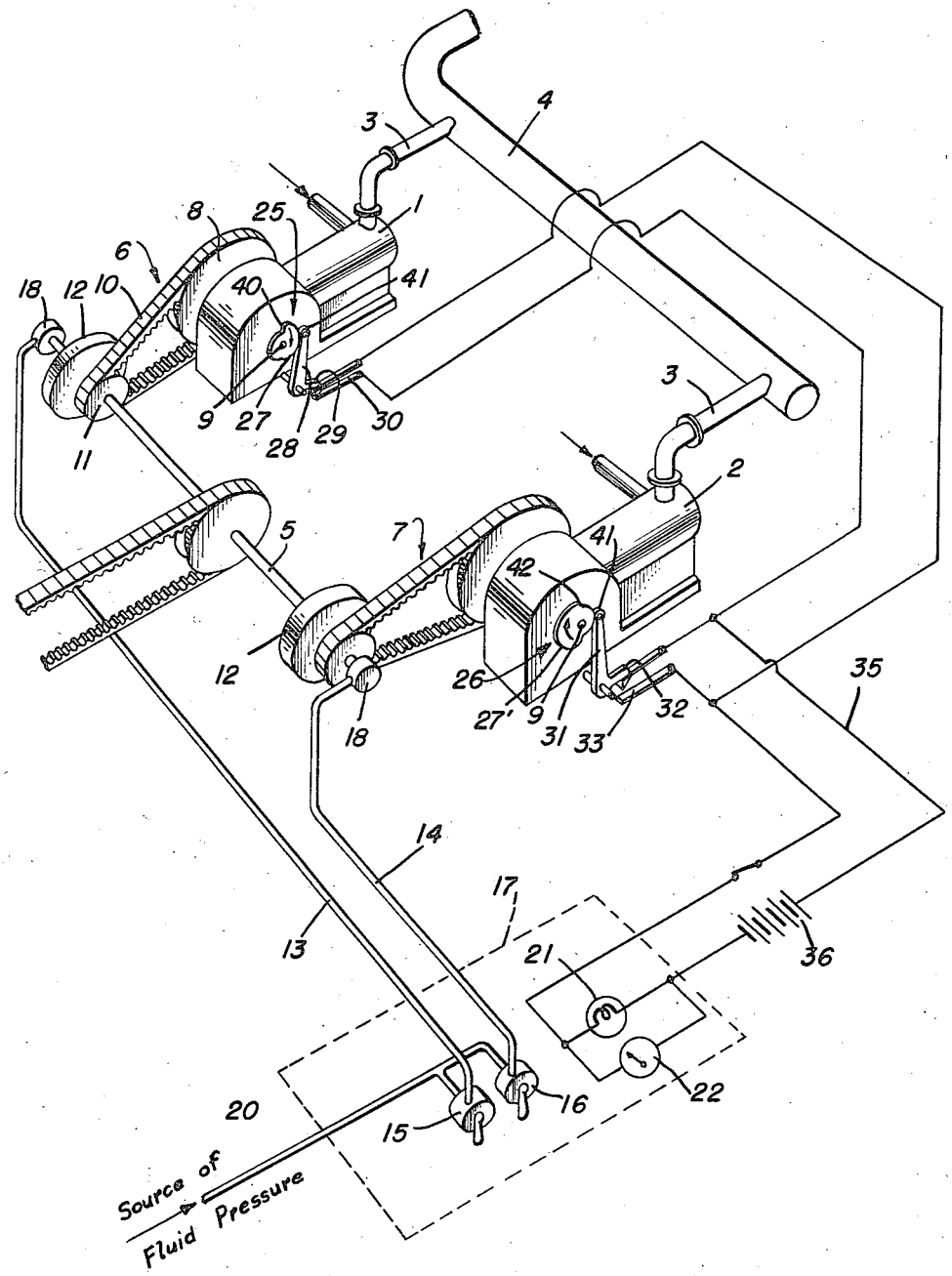

2,821,698

SYNCHRONIZING MEANS FOR RECIPROCATING PUMPS

Eugene M. Richardson, Houston, Tex., assignor, by mesne assignments, to The Youngstown Sheet and Tube Company Application June 27, 1955, Serial No. 518,239

10 Claims. (Cl. 340—268)

This invention relates to pumping systems wherein a pair of reciprocating or pulsating pumps are connected in parallel to a fluid delivery manifold, and relates in particular to a system whereby these pumps may be relatively brought into synchronism and thereafter operated in a desired phase relation.

The invention is of especial utility in the rotary well drilling industry where several high pressure mud pumps are connected in parallel to the mud circulating system. It has been determined that a superior pumping effect is obtained where the pumping strokes of the pump plungers are alternated. Herein this non-simultaneous operation of the pumps is referred to as the phase relation of the pumps. As an example, the pumps may be operated so that the crankshaft of the second pump lags about 140 degrees behind the crankshaft of the first pump.

It is an object of the invention to provide a pumping system wherein the pair of pumps may be controlled, synchronized and checked as to their synchronous operation from a remote point. For example, the pumps, which may be located at some distance from the floor of the derrick may be operated from a station, such as the driller's station, on the derrick floor adjacent the drawworks.

It is an object of the invention to provide a system of this character having an indicating means which by a steady operation of its indicating part will indicate that the pumps are being operated in a predetermined phase relation, and which by a fluctuating condition of its indicating part will indicate that the pumps are not being operated in the selected phase relation.

In the simplest form of the invention herein disclosed, the indicating means consists of a single electric lamp which emits a flickering or intermittent light when the pumps are operating out of the predetermined phase relation, and which lamp is continuously illuminated, without fluctuation, when the pumps are being operated in the proper or predetermined phase relation.

Further objects and advantages of the invention may be brought out in the following part of the specification wherein I have described a preferred embodiment of the invention in detail, for the purpose of competence of disclosure without intending to limit the scope of the invention to the disclosed details, but only as defined in the appended claims.

Referring to the accompanying schematic drawing which shows the preferred form of my invention, mud pumps 1 and 2 are shown with their discharge pipes 3 connected to a mud delivery manifold 4. These mud pumps 1 and 2 are adapted to be simultaneously driven at the same speed of rotation from a power delivery shaft 5 through transmissions 6 and 7.

The transmissions 6 and 7 each have a driven sprocket 8 which is mounted on a pump crankshaft 9, a chain 10 and a drive sprocket 11 arranged to be connected to the shaft 5 by a clutch 12, so as to be driven thereby.

The clutches 12 may be of the air operated type, such as Fawick clutches, with ducts 13 and 14 extended from control valves 15 and 16 located in a remote control station 17. In the operation of air clutches of this type it is customary to deliver the operating air pressure to the clutches through openings in the shafts on which they are mounted. Accordingly, I have shown swivel air connections 18 on the ends of the shaft 5, to which the air ducts 13 and 14 are connected, it being understood that from these swivel connections 18 the air under pressure passes to the clutches 12 through openings in the shaft 5, which openings are not shown herein because they are old and well known in the art.

To indicate whether or not the pumps 1 and 2 are being operated in the predetermined phased relation, I provide in the station 17 an electroresponsive indicating means, which, as the result of a non-fluctuating state of electrical energy therein, will indicate that the pumps are being operated in the desired synchronism, but wherein a fluctuating current flow will indicate that the pumps are out of synchronism.

Such electroresponsive indicating means may be an electric lamp 21 or a meter 22. If the lamp is continuously electrically energized, it will emit a steady illumination, which is indicative that the pumps 1 and 2 are operating in the predetermined or selected phased relation. With respect to the meter 22, a fluctuation of its indicating needle will indicate that the pumps 1 and 2 are out of the desired phase relation. The invention includes rotary switch means 25 and 26 associated with the pumps 1 and 2 for effecting a fluctuating current flow in the electroresponsive indicating means 21 or 22 when the pumps are being operated out of the desired phased relation. The switches 25 and 26 are referred to as "rotary" for the reason that as the result of rotation they effect closing and opening of an electric circuit. The rotary part of the switch means 25 comprises a 180 degree cam 27 connected to the shaft 9 of the pump 1 and being adapted to periodically rotate a switch lever 28 in clockwise direction, this switch lever 28 having a projecting part 29 adapted to close the contacts of a switch 30. In a similar manner the switch means 26 has a 180 degree circular cam adapted to effect periodic clockwise rotation of a switch lever 31, which switch lever 31 has a projection 32 for closing the contacts of a switch 33. The switches 30 and 33 are connected in parallel in a circuit 35 which include the indicating means 21 and 22 and a source of electrical energy shown as a battery 36. A feature of the present invention is that the arc of the cam 27 is complementary to the arc of the cam 27'. By the term "complementary," it is meant that the sum of the arcs of the cams 27 and 27' will equal a full circle of rotation, or 360 degrees. The pump shafts 9 rotate at the same rate, and the cams 27 and 27' are mounted thereon in such manner that when the cranks are offset in the desired phased relation, the cams 27 and 27' will be in complementary relation. That is to say, during a selected arc of rotation of one of the shafts 9 (said selected arc of rotation in the present disclosure being 180 degrees) one cam will close the switch associated therewith while the remaining switch is open. For example, the cam 27, during an arc of rotation of the shafts 9 of 180 degrees, will shift the lever 28 rightwardly and effect a closing of the switch 30. At this time the switch 33 will be open. During the complementary, or consecutive arc of rotation of the shafts 9 (in this instance 180 degrees) the complementary cam 27' will swing the lever 31 rightwardly so as to effect a closing of the switch 33 during the time the switch 30 is open. This means that when the pumps 1 and 2 are being operated in a desired phase relation there will be a constant electrification of the circuit 35. That is to say, current will flow from the battery 36 through either the switch 30 or the switch 33 to the electroresponsive indicating means which is shown as being either a lamp 21 or a meter 22.

Considering that the pump shafts 9 are being rotated in the predetermined phased relation, the cams 27 and 27' are mounted on the shaft 9 in such positions that as the end shoulder 40 of the cam 27 moves out of engagement with the roller 41 at the end of the arm 28, the end shoulder 42 of the cam 27' will move into engagement with the roller 41 at the end of the lever 31, with the result that either the rotary switch means 25 or the rotary switch means 26 will continuously close the circuit 25. But, however, should the shafts be rotated out of the predetermined phase relation, the cams 27 and 27' will be out of their complementary positions previously described, and therefore the cams 27 and 27' will not effect a complementary closing of the switches 30 and 33. Accordingly, there will be an intermittent flow of electric current in the circuit 35 and the lamp 21 will flicker or the needle of the meter 22 will waiver. The driller, noting this indication may then proceed to bring the operation of the pumps 1 and 2 into the desired phase relation. This is accomplished by allowing one of the clutches to "slip," thereby readjusting the relation of one of the sprockets 8 to the shaft 5. As an example, while the shaft 5 is driving both of the pumps 1 and 2, the driller may operate the valve 16 so as to release air pressure from the near clutch 12 associated with pump 2. This release of air pressure need not be sufficient to completely release the near clutch 12 but only sufficient to permit it to slip with relation to the rotation of the shaft 5 which continues at this time to rotate the sprocket 8 of the pump 1 at its original rate. This will effect a relative rotation of the shafts 9 so that they will be brought into the desired phase relation, which will be indicated by a smooth or continuous electrification of the indicating means 21 or 22, at which time the control valve 16 will be actuated so as to effect complete engagement of the near clutch 12.

I claim:

1. In a system for operating in synchronism a pair of pumps each having a power receiving shaft: a pair of rotary switch means, adapted to be connected to said shafts, each switch means being arranged so that it will be closed during 180 degrees of rotation of the shaft to which it is connected and open during the remaining 180 degrees of rotation of the shaft; means connecting said rotary switch means to said shafts of said pumps so that when the shafts are being simultaneously rotated in pre-determined phase relation, one of said switch means will be closed during 180 degrees of each rotation of said shafts and the other of said switch means will be closed during the remaining 180 degrees of rotation of said shafts; power means for rotating said shafts including a drive shaft and a pair of power transmissions respectively connecting said power receiving shafts with said drive shaft, at least one of said transmissions including a clutch means for enabling relative rotation of said power receiving shafts so as to bring them into said predetermined phase relation; an electroresponsive indicating means; and circuit means including a source of electric energy for connecting said switch means in parallel with said indicating means.

2. In a system for operating in synchronism a pair of pumps each having a power receiving shaft: a pair of rotary switch means, adapted to be connected to said shafts, each switch means being arranged so that it will be closed during 180 degrees of rotation of the shaft to which it is connected and open during the remaining 180 degrees of rotation of the shaft; means connecting said rotary switch means to said shafts of said pumps so that when the shafts are being simultaneously rotated in predetermined phase relation, one of said switch means will be closed during 180 degrees of each rotation of said shafts and the other of said switch means will be closed during the remaining 180 degrees of rotation of said shafts; power means for rotating said shafts including a drive shaft and a pair of power transmissions respectively connecting said power receiving shafts with said drive shaft, at least one of said transmissions including a clutch means for enabling relative rotation of said power receiving shafts so as to bring them into said predetermined phase relation; an electroresponsive indicating means; and circuit means for connecting said indicating means with a source of electrical current and in parallel with said switch means so that said indicating means will be continuously energized during operation of said power receiving shafts in said predetermined phase relation and will be intermittently energized when said power receiving shafts are rotating out of said phase relation.

3. In a system for operating in synchronism a pair of pumps each having a power receiving shafts: a pair of rotary switch means, adapted to be connected to said shafts, each switch means being arranged so that it will be closed during 180 degrees of rotation of the shaft to which it is connected and open during the remaining 180 degrees of rotation of the shaft; means connecting said rotary switch means to said shafts of said pumps so that when the shafts are being simultaneously rotated in predetermined phase relation, one of said switch means will be closed during 180 degrees of each rotation of said shafts and the other of said switch means will be closed during the remaining 180 degrees of rotation of said shafts; power means for rotating said shafts including a drive shaft and a pair of power transmissions respectively connecting said power receiving shafts with said drive shaft, at least one of said transmissions including a clutch means for enabling relative rotation of said power receiving shafts so as to bring them into said predetermined phase relation; an electric lamp; and circuit means including a source of electric energy for connecting said switch means in parallel with said lamp.

4. In a system for operating in synchronism a pair of pumps each having a power receiving shaft: a pair of rotary switch means, adapted to be connected to said shafts, each switch means being arranged so that it will be closed during 180 degrees of rotation of the shaft to which it is connected and open during the remaining 180 degrees of rotation of the shaft; means connecting said rotary switch means to said shafts of said pumps so that when the shafts are being simultaneously rotated in pre-determined phase relation, one of said switch means will be closed during 180 degrees of each rotation of said shafts and the other of said switch means will be closed during the remaining 180 degrees of rotation of said shafts; power means for rotating said shafts including a drive shaft and a pair of power transmissions respectively connecting said power receiving shafts with said drive shaft, at least one of said transmissions including a clutch means for enabling relative rotation of said power receiving shafts so as to bring them into said predetermined phase relation; an electric lamp; and circuit means for connecting said lamp with a source of electrical current and in parallel with said switch means so that said lamp will be continuously energized during operation of said power receiving shafts in said predetermined phase relation and will be intermittently energized when said power receiving shafts are rotating out of said phase relation.

5. In a system for synchronizing a pair of pumps having power receiving shafts adapted to be simultaneously rotated in a predetermined phase relation: a pair of rotary switch means adapted to be connected to said power receiving shafts, said switch means being arranged, when said shafts are rotating in said phase relation, so that one of the switch means will be closed during a selected arc of the rotation of said shafts and open during the complementary arc of rotation of said shafts, and the other of said switch means will be open during said selected arc of rotation of said shafts and closed during said complementary arc of rotation of said shafts; an electroresponsive indicating means; and circuit means including a source of electric energy for connecting said switch means in parallel with said indicating means.

6. In a system for synchronizing a pair of pumps having power receiving shafts adapted to be simultaneously rotated in a predetermined phase relation: a pair of rotary switch means adapted to be connected to said power receiving shafts, said switch means being arranged, when said shafts are rotating in said phase relation, so that one of the switch means will be closed during a selected arc of the rotation of said shafts and open during the complementary arc of rotation of said shafts, and the other of said switch means will be open during said selected arc of rotation of said shafts and closed during said complementary arc of rotation of said shafts; and electro-responsive indicating means; and circuit means for connecting said indicating means with a source of electrical current and in parallel with said switch means so that said indicating means will be continuously energized during operation of said power receiving shafts in said predetermined phase relation and will be intermittently energized when said power receiving shafts are rotating out of said phase relation.

7. In a system for synchronizing a pair of pumps having power receiving shafts adapted to be simultaneously rotated in a predetermined phase relation: a pair of rotary switch means adapted to be connected to said power receiving shafts, said switch means being arranged, when said shafts are rotating in said phase relation, so that one of the switch means will be closed during a selected arc of the rotation of said shafts and open during the complementary arc of rotation of said shafts, and the other of said switch means will be open during said selected arc of rotation of said shafts and closed during said complementary arc of rotation of said shafts; an electric lamp; and circuit means including a source of electric energy for connecting said switch means in parallel with said lamp.

8. In a system for synchronizing a pair of pumps having power receiving shafts adapted to be simultaneously rotated in a predetermined phase relation: a pair of rotary switch means adapted to be connected to said power receiving shafts, said switch means being arranged, when said shafts are rotating in said phase relation, so that one of the switch means will be closed during a selected arc of the rotation of said shafts and open during the complementary arc of rotation of said shafts, and the other of said switch means will be open during said selected arc of rotation of said shafts and closed during said complementary arc of rotation of said shafts; an electric lamp; and circuit means for connecting said lamp with a source of electrical current and in parallel with said switch means so that said lamp will be continuously energized during operation of said power receiving shafts in said predetermined phase relation and will be intermittently energized when said power receiving shafts are rotating out of said phase relation.

9. A system as defined in claim 1 wherein said rotary switch means each consists of a switch and a 180 degree cam for closing and opening the contacts of said switch, said cams being adapted to be respectively connected to said power shafts so as to be rotated thereby.

10. A system as defined in claim 8, wherein said rotary switch means each consists of a switch and a cam adapted to be rotated by one of said power receiving shafts, one of said cams being adapted to close the switch associated therewith during said selected arc of rotation, and the remaining cam being adapted to close the switch associated therewith during said complementary arc of rotation.

References Cited in the file of this patent
UNITED STATES PATENTS

| | | |
|---|---|---|
| 1,760,631 | Bryce | May 27, 1930 |
| 2,430,125 | Kipnis | Nov. 4, 1947 |